July 28, 1925.
J. MICHAUD
AIRCRAFT
Filed Aug. 27 1923
1,547,434
6 Sheets-Sheet 3
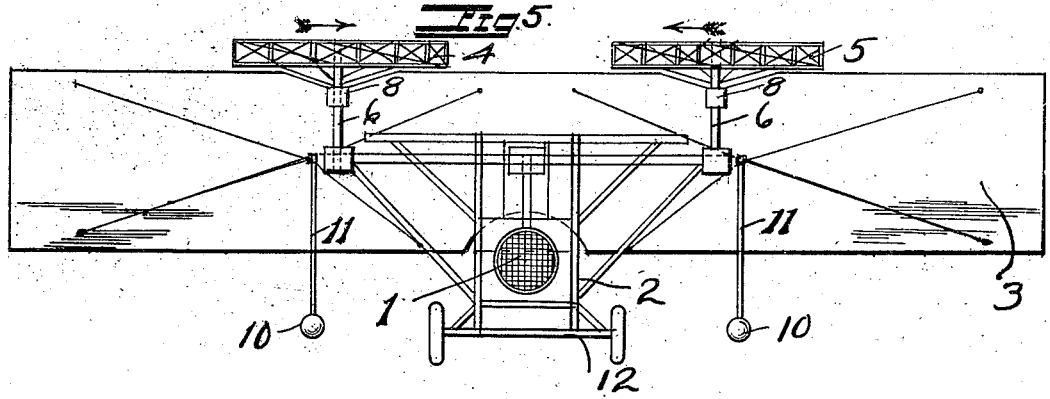
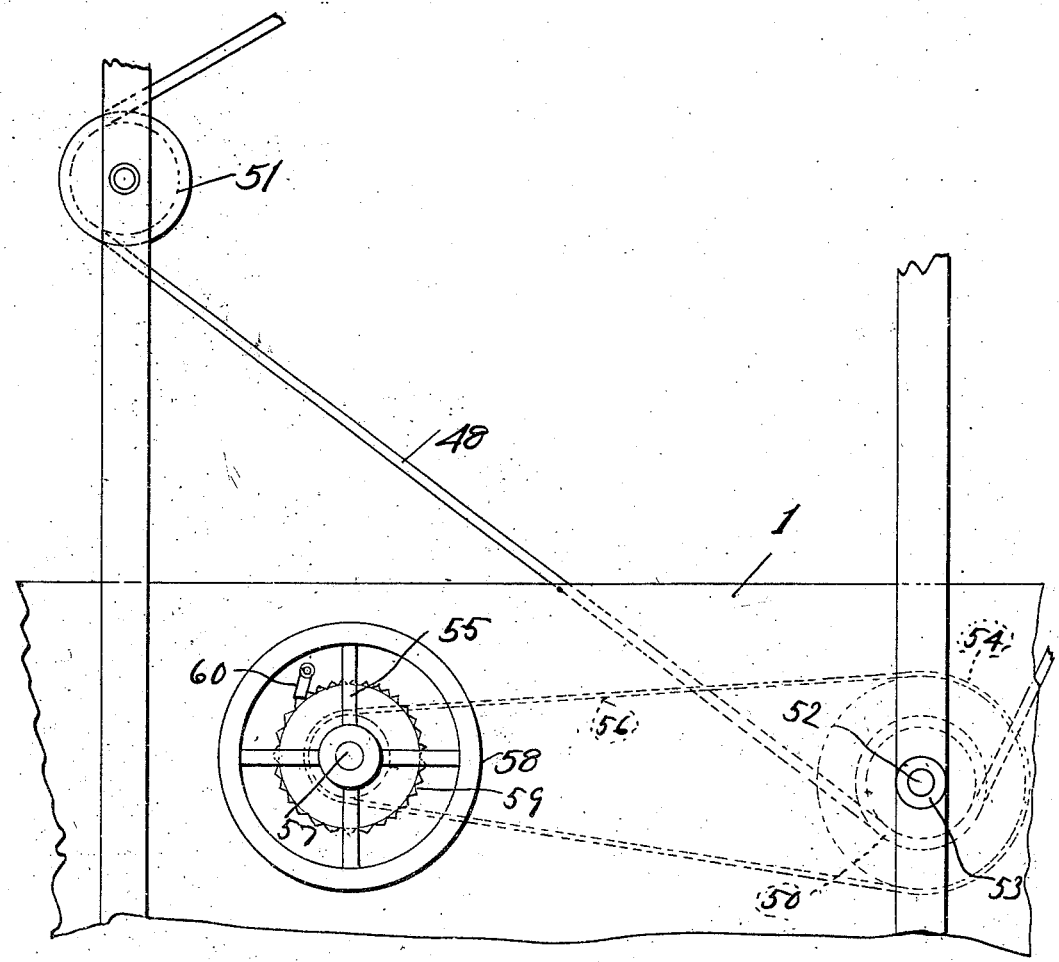
INVENTOR
Joseph Michaud
BY
Munn & Co
ATTORNEYS

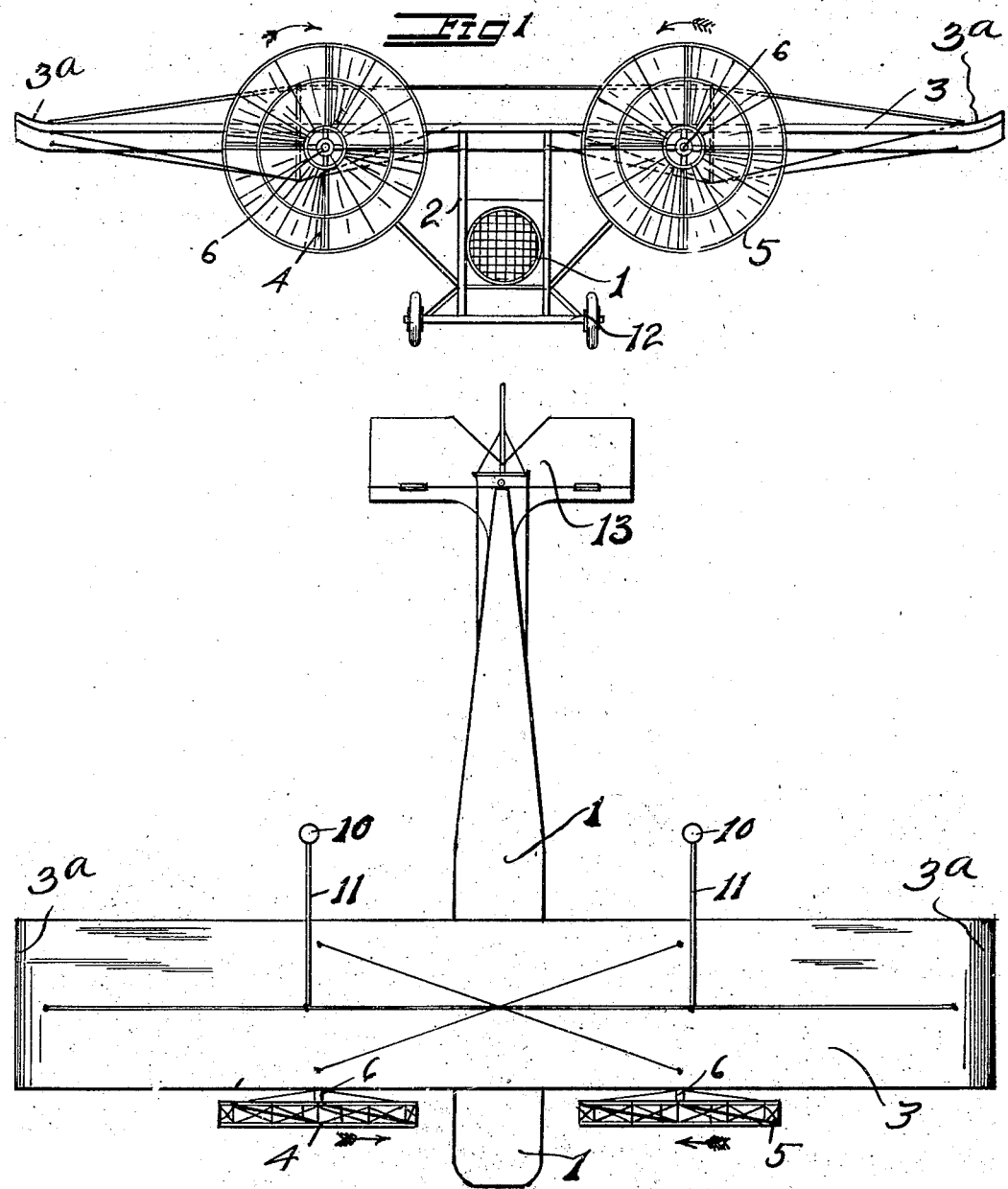

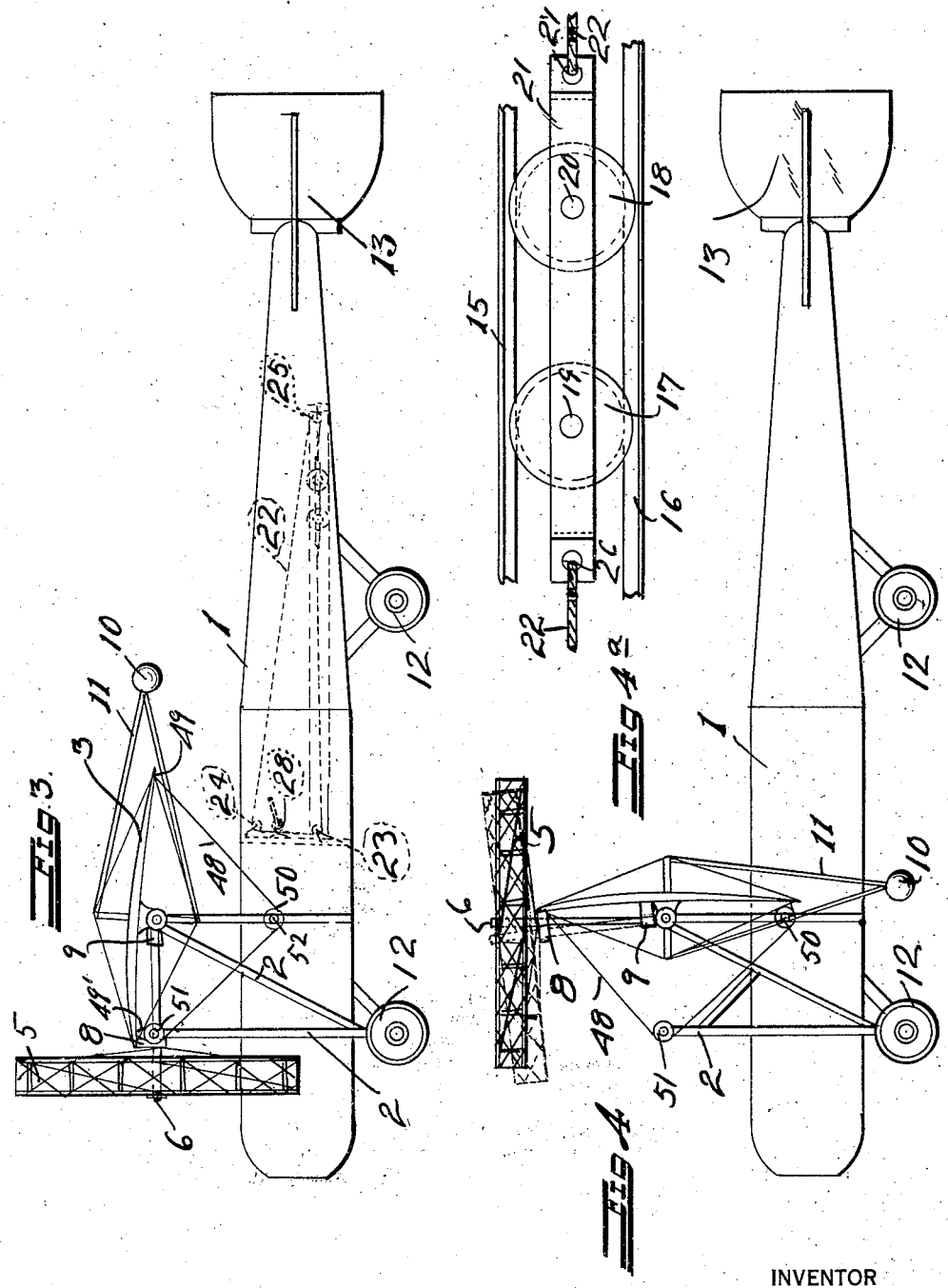

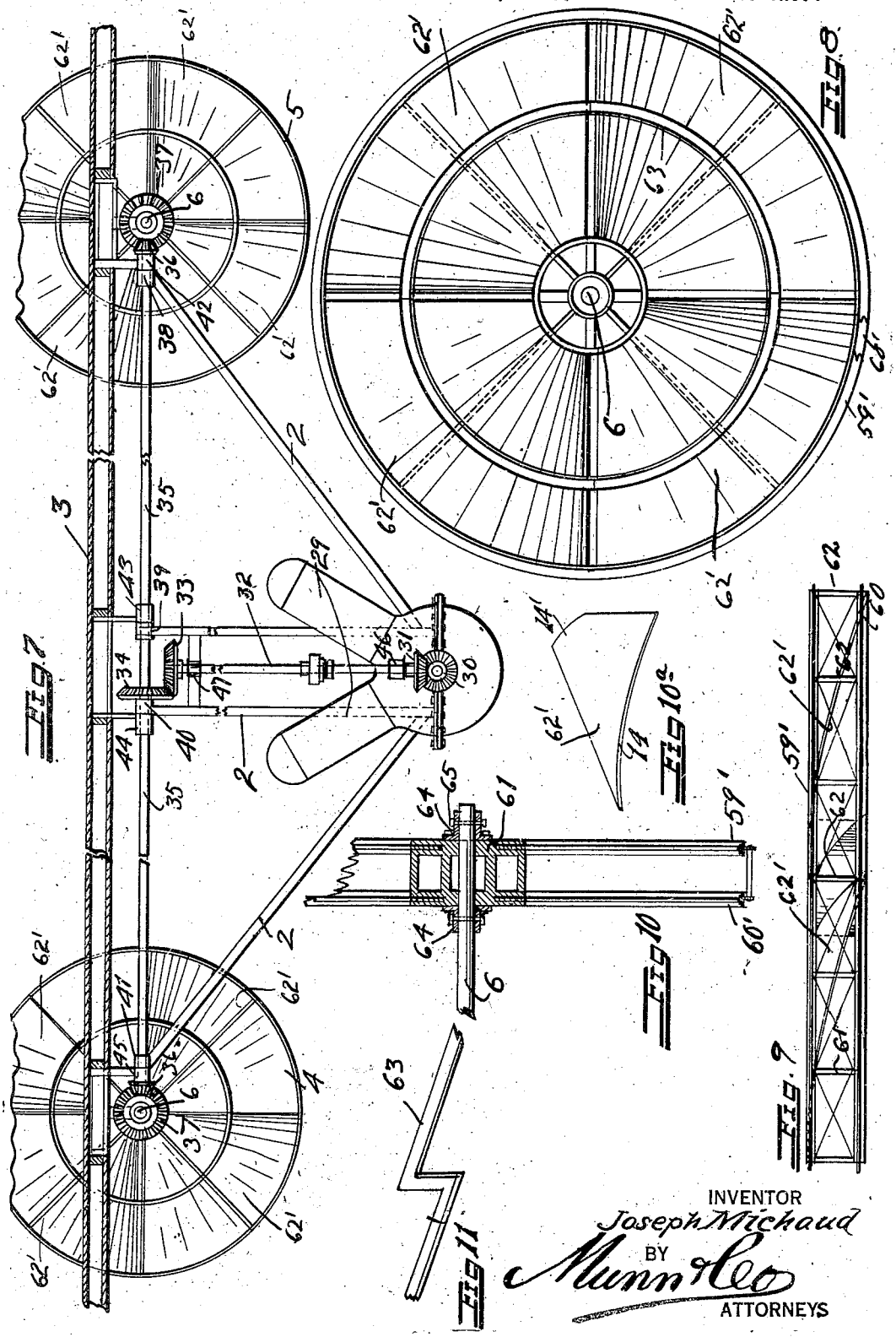

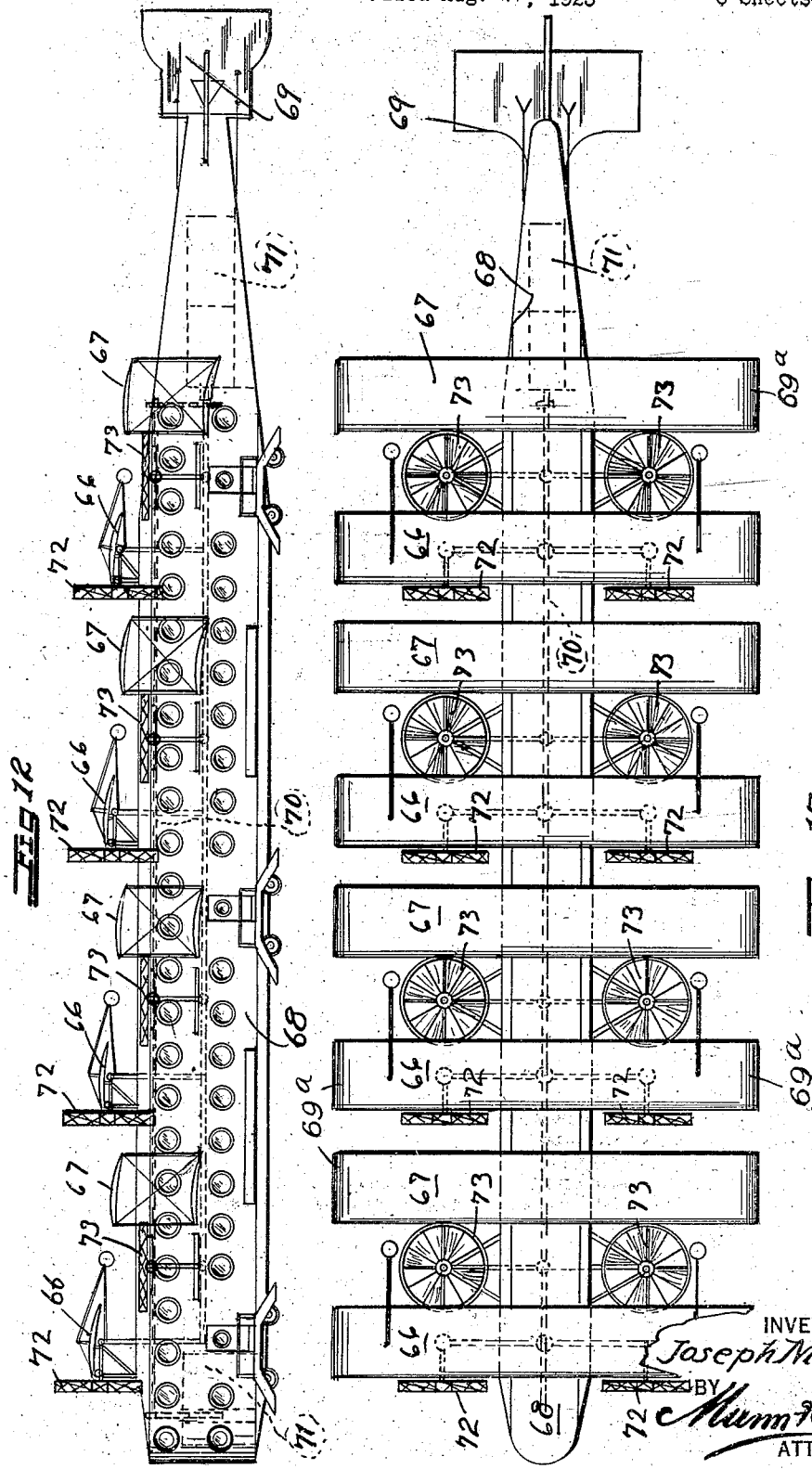

July 28, 1925.
J. MICHAUD
AIRCRAFT
Filed Aug. 27, 1923
1,547,434
6 Sheets-Sheet 6
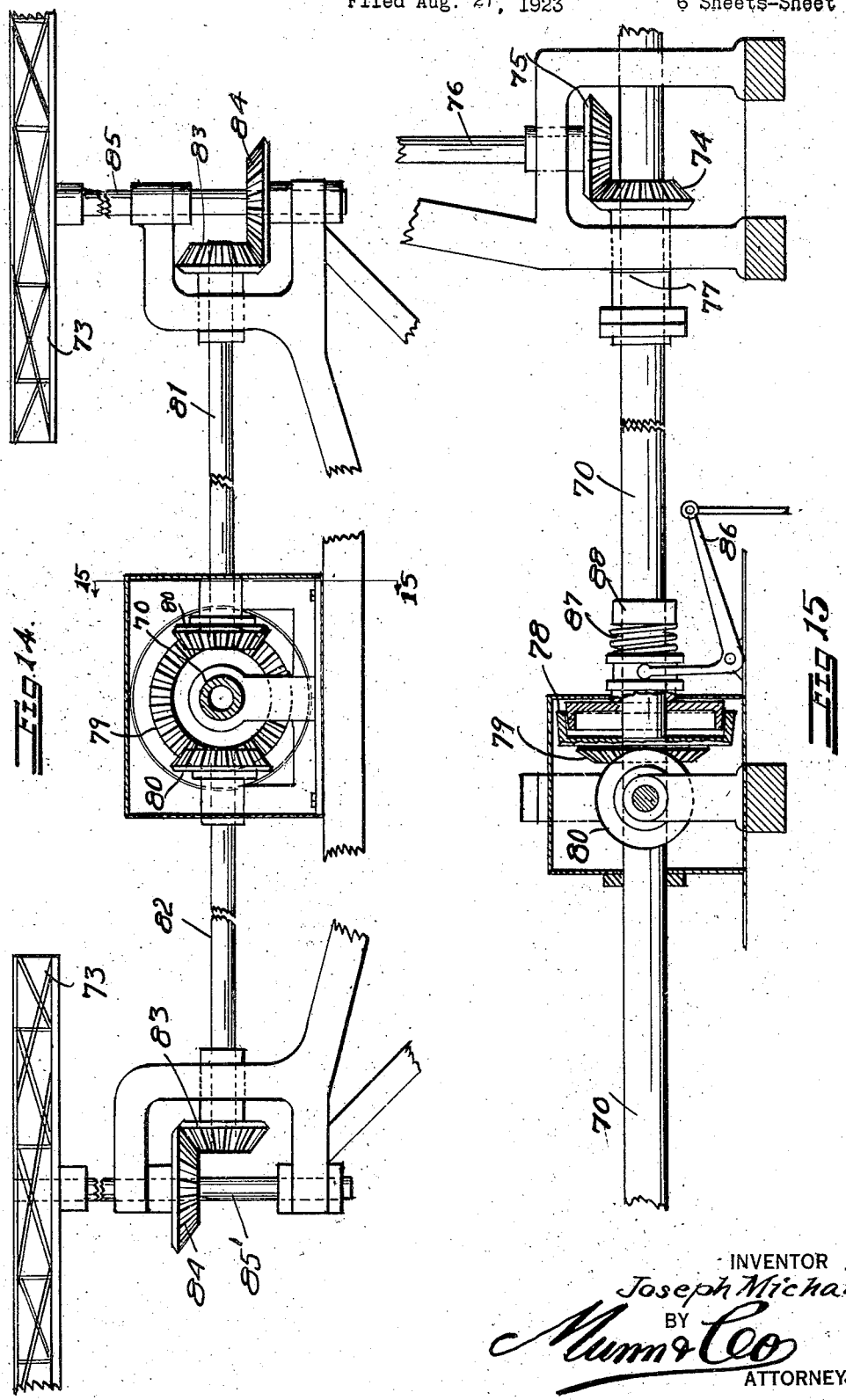
INVENTOR
Joseph Michaud
BY
Munn & Co
ATTORNEYS Patented July 28, 1925.

1,547,434

UNITED STATES PATENT OFFICE.

JOSEPH MICHAUD, OF LODI, CALIFORNIA.

AIRCRAFT.

Application filed August 27, 1923. Serial No. 659,613.

*To all whom it may concern:*

Be it known that I, JOSEPH MICHAUD, a citizen of Canada, residing at Lodi, county of San Joaquin, and State of California, have invented a new and useful Improvement in Aircraft, of which the following is a specification.

This invention relates to improvements in aircraft of the heavier than air type, and one of the objects of the invention is to provide means for raising an aircraft in the air vertically and for driving it ahead after the desired altitude has been reached.

Another object is to provide tiltable planes or wings with propellers mounted thereon, and means for driving the propellers at any angle of the planes from horizontal to vertical.

Another object is to provide a propeller of novel design which will be more effective when used in conjunction with my aircraft.

Another object is to make an airplane unit which may be coupled together in multiple and driven in unison to form an aircraft of any practical size.

Other objects will appear as the description proceeds.

An embodiment of the invention is shown in the accompanying drawing in which the same reference numeral is applied to the same portion throughout, but I am aware that there may be modifications thereof.

Figure 1 is a front elevation of the aircraft when used singly. Figure 2 is a plan of the aircraft, Figure 3 a side elevation of the aircraft, Figure 4 a side elevation with the propellers and plane set for vertical flight, Figure 4ª is a detail of the balancing mechanism shown in dotted lines in Figure 3. Figure 5 is a front elevation of the aircraft shown in Figure 4, Figure 6 is a detail of the means for tilting the planes. Figure 7 is an end view partly in section showing means for connecting the engine and propellers. Figure 8 is a plan of one of the propellers. Figure 9 is an edge view of the propeller shown in Figure 8. Figure 10 is a sectional view of a portion of the propeller. Figure 10ª is a detached view of one of the propeller blades. Figure 11 is a view of a portion of the intermediate brace for the propeller. Figure 12 is a side elevation of a modified form of aircraft built up of unit monoplanes and biplanes. Figure 13 is a plan of the aircraft shown in Figure 12. Figure 14 is a view partly in section showing the arrangement of gearing for driving the stationary lifting propellers and Figure 15 is a view partly in section taken on line 15—15 of Figure 14.

The numeral 1 indicates a fuselage and mounted on the fuselage is a frame 2 on which a plane or wing 3 is pivoted to swing from a horizontal to a vertical position. The ends of this plane are curved in an upward direction at 3ª in order to permit same to maintain its equilibrium.

The plane 3 carries the propellers 4 and 5 which have shafts 6—6 mounted in bearings 8 and 9 fixed to the plane 3.

A counterweight 10 is provided to balance the propellers and is attached to the plane by the frame 11.

The fuselage is provided with suitable landing gear 12 and has the usual empennage 13.

The plane may have suitable control ailerons of well known construction if found desirable. Means for balancing the fuselage is shown in dotted lines in Figure 3 and a detail in Figure 4ª. It consists of the upper track 15 and the lower track 16 suitably supported and adapted to form a track and guide for the grooved wheels 17 and 18 which are mounted on shafts 19 and 20 fixed to the frame 21 a cable 22 is attached to one end of the frame and run over pulleys 23—24 and 25 and to the other end of the frame. The cable may be in reach of the pilot whereby the carriage can be pulled back and forth to find the balancing point, any suitable means may be used to hold the rope and carriage in any position such as the clamp 28.

The propellers 4 and 5 are driven by means of the engine 29 mounted in the fuselage through bevel gears 30 and 31, shaft 32, bevel gears 33 and 34, shaft 35 bevel gears 36 and 37, shaft 6. The shaft 35 is mounted on the frame by bearings 38 to 41 inclusive. The plane 3 has bearing brackets fixed thereto which carry the bearings 42 to 45 inclusive, thereby allowing the plane 3 to swing with the shaft 35 as a pivot.

The shaft 32 is journaled in bearings 46 and 47. The plane with the propellers are tilted by means of a cable or chain. In this instance a cable 48 is shown, one end of which is fixed to the plane at 49, and passed around the pulleys 50 and 51 to the other edge of the plane at 49′. The pulley 50 is fixed on the shaft 52 and mounted in the bearing 53. On the shaft 52 is fixed a sprocket wheel 54 which is connected to a sprocket wheel 55 by an endless chain 56. The sprocket wheel 55 is fixed to a shaft 57 which is mounted in suitable bearings near the pilot's seat, and has the hand wheel 58 whereby the plane can be tilted from a horizontal to a vertical position, or at any angle, and held by means of the toothed wheel 59 and pawl 60', the pawl can be turned around on its pivot to hold the wheel against resistance from either direction.

The propeller consists of two circular rings 59' and 60' made preferably of T iron concentric with the hub 61, and spaced apart by the rods 62. Any number of blades 62' may be used; in this instance four are shown. These blades are fixed to the rings and to the hub, and have an intermediate bracing ring 63 which is bent to conform to the pitch of the blades as shown in Figure 11 and is firmly fixed thereto. Brackets 64 are bolted to the hub 61 and have bolts 65 passing through the shaft 6.

The modified form shown in Figures 12 and 13 comprises an aircraft of large capacity made up of tiltable monoplanes 66 the same as described above alternated with stationary biplanes 67 mounted on a fuselage 68 having the well known form of empennage 69. These planes have their ends curved upward at 69ª for the purpose referred to herein.

A main drive shaft 70 extends longitudinally in the top portion of the fuselage in this instance, but may be placed on top and outside of the fuselage or on the side or any desired position, and has an engine 71 at each end adapted to drive the shaft in unison. The propellers on the tiltable planes are driven from the shaft 70 through gears 74 and 75 and shaft 76; the shaft 76 corresponds to shaft 32 and is geared to the propellers in the same way. Suitable bearings 77 are provided for the shaft 70 in spaced relation. Each pair of stationary propellers 73 is provided with a clutch 78 which may be of any form and connects the gears 79 and 80 with the shafts 81 and 82 which have the gears 83 and 84 adapted to drive the propellers through the shafts 85 and 85'.

The clutch 79 is disengaged by the lever 86, and held in contact by the spring 87 acting against the collar 88 on the shaft 70.

In starting the monoplane from the ground, the planes are tilted to the vertical position, the engine is started and the plane rises vertically; when the desired altitude is reached the plane is tilted back to the horizontal position whereupon the plane is driven forward. It may be found desirable to make the starting flight from the ground at an angle instead of straight up which is accomplished by setting the plane at the required angle.

In the operation of the large aircraft all the monoplanes are tilted to the vertical position, the engines are started, driving the main shaft, and through it all the propellers, after the desired altitude is reached, the monoplanes are tilted back to normal position, and the stationary horizontal propellers are stopped by throwing out the clutches. In making a landing the clutches are again thrown in and the engines are slowed up to allow the aircraft to settle to a landing.

I have described an aircraft with two engines, but it is obvious that a number of engines or power plants could be connected to the main shaft by means of clutches so that for extraordinary speed all the engines could be used, but for the purpose of keeping up in the air one or two engines would be sufficient; this would make flying much safer. In landing instead of slowing up the engines a variable speed gearing or clutch could be used.

While I have shown only the preferred form of my invention I wish it to be understood that various changes and modifications may be made within the scope of the claims hereto attached without departing from the spirit of the invention.

I claim:

1. An aircraft of the class described, comprising a fuselage, a frame on said fuselage, a plane pivoted on said frame, propellers with shafts journaled in said plane, means to drive said propellers, a cable attached to one edge of said plane and passed over pulleys to the opposite edge of said plane and means for driving one of said pulleys in either direction to control the tilting movement of said plane.

2. An aircraft of the class described comprising a fuselage, a frame on said fuselage, a supporting plane above the frame, a plurality of propellers on shafts mounted on the plane, an engine in said fuselage, a pair of bevel gears connecting the shaft of said engine with a vertical shaft, gears connecting said vertical shaft with a pivot shaft extending to gears on the propeller shafts of said plane, bearings for said shafts, some secured to the frame and some to the plane whereby the pivot shaft becomes the point of suspension of the fuselage from the plane, and means for tilting said plane on said pivot shafts.

3. In an aircraft of the character described, a tiltable main supporting plane having a driving propeller operatively mounted thereon and tiltable therewith, means for maintaining the balance of the aircraft upon tilting the plane and propeller, comprising a round weight rollable along a track in the fuselage and means for holding it in adjusted position.

4. An aircraft of the class described comprising a fuselage, a frame on said fuselage, a plane pivoted on said frame and adapted to swing from a horizontal to a vertical position, propellers on said plane, counterweights projecting opposite said propellers means to control the tilting movement of said plane and means to drive said propellers at any angle of said plane.

5. An aircraft comprising a fuselage, a plurality of tiltable monoplanes mounted on said fuselage, a plurality of fixed biplanes mounted on said fuselage said monoplanes and said biplanes being alternately spaced from each other, propellers on said tiltable planes at opposite sides of the fuselage, lifting propellers adjacent the front edge of each of said biplanes at opposite sides of the fuselage and means for driving said propellers.

6. An aircraft comprising a fuselage, a plurality of tiltable monoplanes alternated with fixed biplanes mounted on said fuselage, propellers on said monoplanes, propellers adapted to lift the aircraft, mounted adjacent the front edge of said biplanes a main drive shaft mounted in bearings longitudinally of said fuselage, one or more engines for driving said shaft and means to drive said propellers from said shaft.

7. Aircraft including a tilting plane, means for tilting the plane bodily, and an angularly adjustable propeller associated with said plane to constantly maintain a fixed relation thereto and a weight means carried by said plane for counterbalancing said propeller.

8. Aircraft including a fuselage balancing means therefor movable in the length thereof to respectively different positions, a sustaining plane mounted to tilt upon said fuselage, a propeller carried by said plane and means on said plane to counterbalance the weight of said propeller.

JOSEPH MICHAUD.